United States Patent [19]

Tatsumi et al.

[11] Patent Number: 5,091,915
[45] Date of Patent: Feb. 25, 1992

[54] SEMICONDUCTOR LASER EXCITED SOLID LASER DEVICE

[75] Inventors: Kenji Tatsumi; Yoshihito Hirano, both of Kanagawa, Japan

[73] Assignee: Mitsubishi Denki K.K., Tokyo, Japan

[21] Appl. No.: 618,427

[22] Filed: Nov. 27, 1990

[30] Foreign Application Priority Data

Dec. 25, 1989 [JP] Japan .................. 1-335585
Apr. 2, 1990 [JP] Japan .................. 2-88052
Sep. 26, 1990 [JP] Japan .................. 2-256322

[51] Int. Cl.$^5$ .................................. H01S 3/094
[52] U.S. Cl. .................................. 372/75
[58] Field of Search .................................. 372/75

[56] References Cited

U.S. PATENT DOCUMENTS

| | | | |
|---|---|---|---|
| 3,624,545 | 11/1971 | Ross | 372/75 |
| 4,653,056 | 3/1987 | Baer et al. | 372/27 |
| 4,710,940 | 12/1987 | Sipes, Jr. | 372/75 |
| 4,785,459 | 11/1988 | Baer | 372/75 |
| 4,916,712 | 4/1990 | Bender | 372/75 |
| 4,969,155 | 11/1990 | Kahan | 372/75 |

*Primary Examiner*—James W. Davie
*Attorney, Agent, or Firm*—Sughrue, Mion, Zinn, Macpeak & Seas

[57] ABSTRACT

A semiconductor laser excited solid laser device of side light excited type in which the excitation region is well matched with the mode volume of the laser oscillation mode, for providing high output and high efficiency. The semiconductor laser excited solid laser device comprises a diffraction grating for diffracting the output light beams of the semiconductor lasers in a direction of formation of the laser resonator mode in application of the output light beams to the solid laser medium.

10 Claims, 9 Drawing Sheets

A-A

A-A

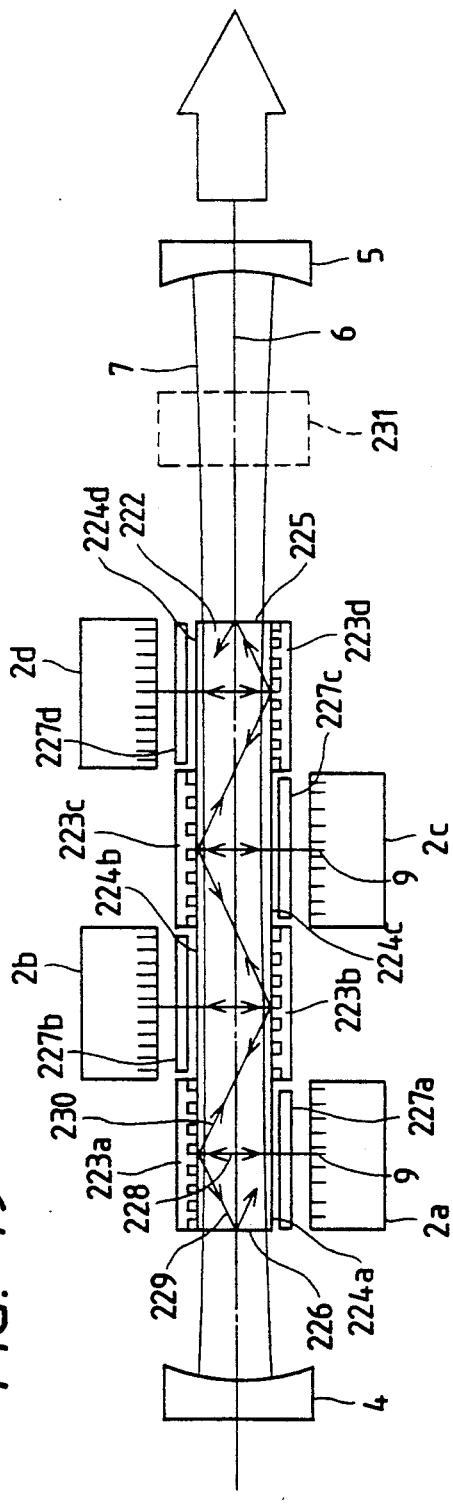
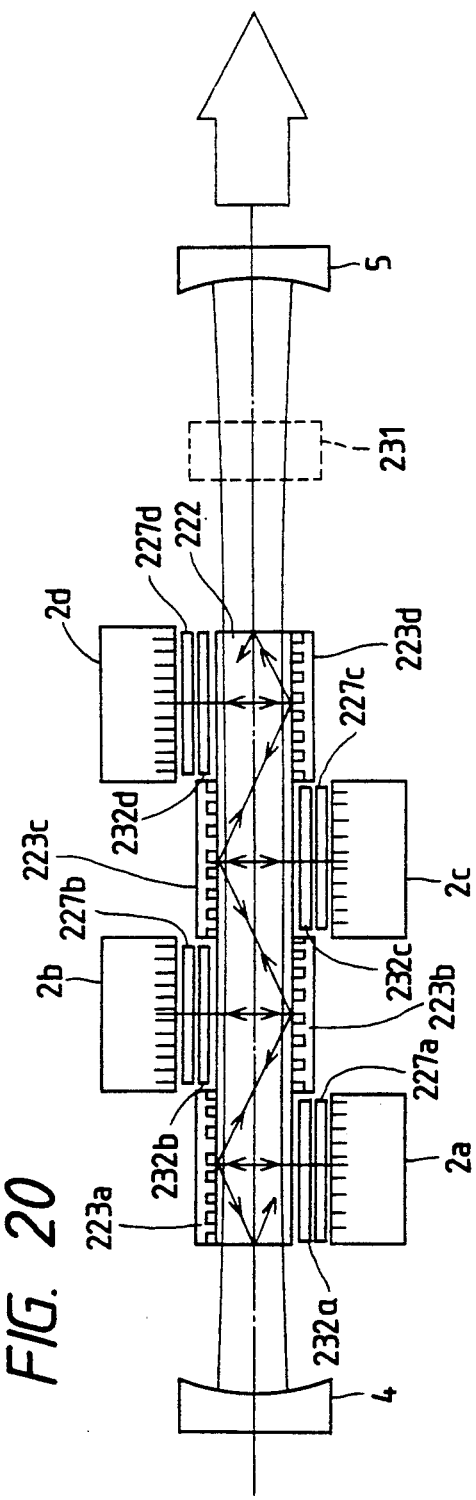
FIG. 19
FIG. 20

SEMICONDUCTOR LASER EXCITED SOLID LASER DEVICE

BACKGROUND OF THE INVENTION

This invention relates to a solid laser device which efficiently performs excitation using a semiconductor laser, and more particularly to means for introducing a pumping light beam from a semiconductor laser to a solid laser medium with high efficiency.

FIG. 1 is an explanatory diagram showing the arrangement of a semiconductor laser excited solid laser device disclosed by U.S. Pat. No. 3,624,545, patented on Nov. 3, 1971.

In FIG. 1, reference numeral 1 designates a solid laser medium; 2, a semiconductor laser array; 3, a reflecting cylinder; 4, a high reflection mirror; 5, an output coupling mirror; 6, an optical axis; and 7, a laser resonator mode. That is, FIG. 1 shows a so-called "side light excited solid laser device" in which the solid laser medium 1 is excited by light emergent from the semiconductor laser array 2 which is an array of a number of semiconductor lasers having a light emission spectrum substantially equal to the absorption spectrum of the solid laser medium 1.

The output light of the semiconductor laser array 2 is applied to the solid laser medium 1 in such a manner that it is substantially perpendicular to the side of the latter. A part of the light is absorbed by the solid laser medium 1, and the remaining passes through the solid laser medium 1, and reflected by the reflecting cylinder 3, so that it is applied to the solid laser medium 1 again, thus forming an excitation region permitting laser amplification. The high reflection mirror 4 and the output coupling mirror 5 form a laser resonator, thus providing the laser resonator mode 7. The excitation region is not particularly related to the mode distribution of the laser resonator mode 7; that is, it is lo provided substantially throughout the solid laser medium 1. It is preferable to select the laser oscillation $TEM_{oo}$ mode (Transverse ElectroMagnetic mode) which is the fundamental of the laser resonator mode 7. FIG. 2 is a sectional view taken across the optical axis 6 in FIG. 1, showing the relation between the excitation region permitting laser amplification and the laser resonator mode 7. In FIG. 2, reference numeral 8 designates the excitation region. Almost all the excitation energy accompanying the output light of the semiconductor laser array 2 is applied to the region of the solid laser medium 1 except that occupied by the laser resonator mode 7; that is, a larger part of the excitation energy does not concern the amplification of the laser oscillation mode, with the result that the excitation is low in efficiency.

In order to eliminate the difficulty that the excitation region and the laser oscillation mode are greatly different from each other in size or in volume, U.S. Pat. No. 4,653,056 patented on Mar. 24, 1987 has disclosed an end (face) light excited solid laser in which the emergent light of an exciting light source, namely, a semiconductor laser is arranged substantially in parallel with the optical axis 6 of the laser resonator described above, so that excitation is made from the end face of the solid laser medium 1 which is substantially perpendicular to the optical axis 6. The arrangement of the solid laser disclosed by the U.S. Pat. No. 4,653,056 is as shown in FIG. 3. In FIG. 3, reference numeral 9 designates a semiconductor laser; 10, a lens; and 11, a pumping light beam. The divergent emergent light of the semiconductor laser 9 is converted by the lens 10 into a convergent light beam. The convergent light beam, after passing through the high reflection mirror 4, is applied to the solid laser medium 1 through one of the end faces which are substantially perpendicular to the optical axis 6. In order to increase the efficiency of excitation, the excitation region is matched with match the mode volume of the fundamental mode $TEM_{oo}$ of the laser oscillation mode 7. The end light excited solid laser using semiconductor laser is high in the efficiency of excitation, because the excitation can be matched with the mode volume of the fundamental mode $TEM_{oo}$. However, the output of the solid laser is limited, because almost all the conventional semiconductor lasers are limited to about 1 W in output, and even if a higher output semiconductor laser is employed as pumping light source, the energy usable for the end light excited solid laser is limited. On the other hand, the side light excited solid laser can introduce much more energy from the pumping light source into the solid laser medium; however, it suffers from the matching of the excitation region with the mode volume of the $TEM_{oo}$ mode.

In order to overcome this difficulty, U.S. Pat. No. 4,710,940 patented on Dec. 1, 1987 has disclosed a solid laser in which, a pumping light source, namely, a semiconductor laser array is of a side light excited type, but its laser resonator is changed in arrangement so that the output light of the semiconductor laser array coincides substantially with the optical axis of the laser resonator.

The solid laser disclosed by the U.S. Pat. No. 4,710,940 is as shown in FIG. 4. In FIG. 4, reference numeral 12 designates a trapezoid solid laser medium having first and second side faces 14 and 15; 13, a first end face; and 16, a second end face. Multi-layer films of dielectric are formed on the first and second side faces 14 and 15 which reflect the wavelength of oscillation of the solid laser at high percentage, but which reflect the wavelength of oscillation of the semiconductor laser at low percentage 19 which is the pumping light source. Similarly, multi-layer films of dielectric are formed on the first and second end faces 13 and 16 which reflect the wavelength of oscillation of the solid laser at low percentage. In the solid laser thus constructed, the laser beam in the laser resonator, as shown in FIG. 4, advances zigzag in the solid laser medium 12 while being reflected between the first and second side faces 14 and 15. On the other hand, the output light of the semiconductor laser, which is the pumping light source, is obliquely applied to the first side face 14 or the second side face 15 in such a manner that its optical axis coincides substantially with that of the laser beam advancing zigzag. Therefore, similarly as in the case of the end light excited solid laser described with reference to FIG. 3, the excitation region can be matched with the mode value of the $TEM_{oo}$ mode which is the fundamental of the laser oscillation mode 7. However, it should be noted that the reflectivity of the high reflection multi-layer films of dielectric formed on the first and second side faces 14 and 15 is not more than 99.5% for instance because the manufacturing accuracy is limited; that is, the light suffers from a loss of 0.5% every reflection. Hence, if the number of times of reflection is increased to obtain a high output, then the loss is increased as much.

On the other hand, U.S. Pat. No. 4,785,459 has disclosed a solid laser comprising a diode bar made up of a plurality of semiconductor lasers arranged at certain intervals. FIG. 5 shows one example of the high efficiency mode harmonic type solid laser device disclosed by the U.S. Pat. No. 4,785,459.

In FIG. 5, reference numeral 17 designates a laser block of solid laser medium; 18, a diode bar made up of a plurality of semiconductor lasers arranged at predetermined intervals; 20, a fiber lens; 21, a first incident end face; and 22, a second incident end face.

The operation of the solid laser thus constructed will be described. The output light of the semiconductor lasers forming the diode bar 18 is larger in the divergent angle perpendicular to the surface of the drawing than in the divergent angle in parallel with it. Therefore, the output light is applied to the laser block 17 in such a manner that its vertical component is converted into a parallel light beam by the fiber lens 20, and its beam diameter is harmonic with the size of the lateral mode of the solid laser. If, in this case, the wavelength of the output light of the diode bar 18 is made coincident with the absorption band of the solid laser medium, then the output light of the diode bar 18 is absorbed exponentially while propagating in the laser block 17, so that an inverted population is formed which has gain with the wavelength of oscillation of the solid laser. The inverted population is large at the light emission positions of the semiconductor lasers and small at the connecting positions of the semiconductor lasers, reflecting the spatial distribution of the output light of the diode bar 18 which has passed through the fiber lens 10. A high reflection mirror 4 and an output coupling mirror 5 are so positioned as to form a laser resonator having an optical path such that, inside the laser block 17, the output light of the diode bar 18 is reflected zigzag between the first and side face 14 substantially in coincidence with the light emission positions of the semiconductor lasers forming the diode bar 18 and the second side face 15. A dichroic film is formed on the fist side face 14 to which the output light of the diode bar 18 is applied, which film shows no reflection for the wavelength of the output light of the diode bar 18 but shows high reflection for the wavelength of oscillation of the solid laser. A coating which is highly reflective for the wavelength of oscillation of the solid laser is formed on the second side face 15. A coating which is not reflective for the wavelength of oscillation of the solid laser is formed on the first and second incident end faces 21 and 22 through which the laser beam is applied to the high reflection mirror 4 and the output coupling mirror 5. With the laser resonator thus constructed, the energy of the light emergent from the diode bar 18 can be coupled to the laser oscillation mode with high efficiency. The oscillation output of the solid laser can be increased by increasing the number of semiconductor lasers forming the diode bar 18; i.e., by increasing the number of times of zigzag reflection.

As was described above, the conventional side light excited solid laser shown in FIG. 1 is disadvantageous in that almost all the energy accompanying the output light of the semiconductor laser array 2 is applied to the region of the solid laser medium 1 except that occupied by the laser resonator mode; that is, a larger part of the energy does not employed for amplification of the laser oscillation mode.

In the conventional end light excited solid laser as shown in FIG. 3, the excitation region can be matched with the mode volume of the $TEM_{oo}$ mode, and the excitation efficiency is high accordingly. However, the solid laser is still disadvantageous in that its output is limited; that is, it is impossible to provide high power because the output of a conventional semiconductor laser is not more than 1 W, and the energy used by the end light excited solid laser is limited even if a higher output semiconductor laser is employed as pumping light source.

The conventional semiconductor laser excited solid laser device as shown in FIG. 4 or 5 is disadvantageous in the following points: (1) In order to realize the excitation with high efficiency, it is necessary to coincide the positions of the semiconductor lasers forming the diode bar 18 with the reflecting positions of the zigzag optical path forming the laser resonator. Hence, it is difficult to adjust the positional relation between the high reflection mirror 4 and the output coupling mirror 5. (2) The high reflection film formed on the laser block 17 is the multi-layer film of dielectric; however, it is difficult to provide a multi-layer film of dielectric having a reflectivity of 100 % because of the optical absorption and scattering of the multi-layer film and the limitation in manufacturing accuracy of the latter; that is, the reflectivity is not more than 99.5%. Accordingly, the light suffers from a loss of about 0.5% every reflection. That is, when the zigzag optical path is increased in the number of times of reflection, the loss in the laser resonator is increased. (3) It is necessary to apply a coating non-reflective for the wavelength of oscillation of the solid layer on part of the side face which is made up of the first and second incident end faces 21 and 22 confronting the end face to which the output light of the diode bar 18 is applied, and the second side face 15, so that the laser beam is applied to the high reflecting mirror 4 and the output coupling mirror 5. That is, in manufacturing the solid laser, it is necessary to define the solid laser with the high reflection coating region and the non-reflection coating region. Thus, the number of manufacturing step is relatively large.

SUMMARY OF THE INVENTION

Accordingly, an object of this invention is to eliminate the above-described difficulties accompanying a conventional semiconductor laser excited solid laser.

More specifically, an object of the invention is to provide a semiconductor laser excited solid laser device in which, although it is of side light excited type, the excitation region is well matched with the mode volume of the laser oscillation mode, providing high output and high efficiency.

A semiconductor laser excited solid laser device according to a first aspect of the invention comprises: a solid laser medium; semiconductor laser arrays arranged longitudinally along both side faces of said solid laser medium, for applying pumping light to the solid laser medium; a resonator for forming a laser resonator mode in the solid laser medium; a solid laser medium block including a diffraction grating block in which transmission type diffraction gratings and reflection type diffraction gratings are alternately arranged between the solid laser medium and the semiconductor laser arrays in such a manner that the diffraction gratings are substantially in parallel with the semiconductor laser arrays; and rod lenses disposed between the solid laser medium block and the semiconductor laser arrays.

A semiconductor laser excited solid laser device according to a second aspect of the invention, comprises: a diffraction grating for diffracting the output light beams of the semiconductor lasers in a direction of formation of the laser resonator mode in application of the output light beams to the solid laser medium. Furthermore in the solid laser device, a reflection type diffraction grating is employed as the diffraction grating.

Furthermore, in the solid laser device, non-reflection coatings and reflection type diffraction gratings arranged near or in contact with the solid laser medium are alternately located on the side faces of the solid laser medium block.

In the semiconductor laser excited solid laser device according to the invention, the diffraction gratings diffract the output light beams of the semiconductor lasers which are adapted to excite the solid laser medium, so that the pumping light beams are changed in the direction of propagation. Accordingly, the direction of the pumping light beam in the solid laser medium can be made substantially coincident with the direction of formation of the laser resonator mode, and the excitation region is well matched with the mode volume of the laser oscillation mode. Thus, the solid laser device is high both in output and in efficiency. In addition, the diffraction by the transmission type diffraction grating can be achieved by the reflection type diffraction grating whose grating depth is half of that of the transmission type diffraction grating.

BRIEF DESCRIPTION OF THE DRAWINGS

FIGS. 19 and 20 are explanatory diagrams showing examples of a semiconductor laser excited solid laser device which employs a plurality of diffraction gratings and a plurality of semiconductor laser array according to the invention.

DETAILED DESCRIPTION OF THE PREFERRED EMBODIMENTS

Preferred embodiments of this invention will be described with reference to the accompanying drawings. For simplification in description, it is assumed that, in those embodiments, the laser resonator is so designed that the solid laser medium is in the form of a quadrangular prism, and the direction of the principal axis of the quadrangular prism coincides with the direction of the optical axis of the laser resonator, and the pumping light source is such that a semiconductor laser's pumping light is applied to the solid laser medium from side, or in a direction substantially perpendicular to the principal axis.

Figure 16:
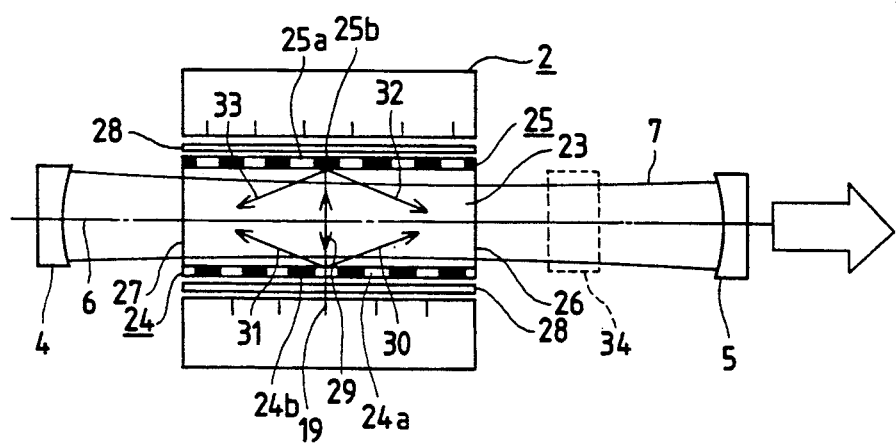
FIG. 16 is an explanatory diagram showing the arrangement of one example of a semiconductor laser excited solid laser device according to a first aspect of this invention.

FIG. 16 shows a first example of a semiconductor laser excited solid laser device according to the invention.

In FIG. 16, reference numeral 23 designates a solid laser medium block; 24, a first diffraction grating; 24a, first transmission type diffraction gratings; 24b, first reflection type diffraction gratings; 25, a second diffraction grating; 25a, second transmission type diffraction gratings; 25b, second reflection type diffraction gratings; 26, a first surface; 27, a second surface, 28, rod lenses; 29, a zero-order diffraction light beam; 30, a first first-order diffraction light beam; 31, a first minus first-order diffraction light beam; 32, a second first-order diffraction light beam; 33, a second minus first-order diffraction light beam; and 34, an optical element in the resonator. The first diffraction grating 24 and the second diffraction grating 25 are formed on the surface of the solid laser medium block 23 in such a manner that the first transmission type diffraction gratings 24a are confronted with the second reflection type diffraction gratings 25b. A dielectric multi-layer film which is highly reflective for the pumping light of the semiconductor laser array 2 and substantially not reflective for the wavelength of oscillation of the solid laser is formed on each of the first and second surfaces 26 and 27.

The semiconductor laser array 2 is arranged along the side of the solid laser medium block 23 on which the first and second diffraction gratings 24 and 25 are formed as was described before, thus forming a pumping light source. The semiconductor laser array 2 is made up of a plurality of semiconductor lasers 19 arranged at equal intervals in the longitudinal direction of the array in such a manner that their junctions are substantially in parallel with one another. More specifically, the distance between the semiconductor lasers 19 is equal to that between the first transmission type diffraction gratings 24a forming the first diffraction grating 24, or that between the second transmission type diffraction gratings 25a forming the second diffraction grating 25. The light emergent from one of the semiconductor lasers 19 is such lo that its divergent angle in a direction perpendicular to the surface of the drawing is larger than that in a direction parallel with the same surface. Therefore, it is passed through the rod lens 28 which shows diffraction only in a direction perpendicular to the surface of the drawing, to convert it into a parallel light beam.

The substantially parallel light beam passed through the rod lens 28 is applied to the first transmission type diffraction grating 24a, thus forming a zero-order diffraction light beam 29, first first-order diffraction light beam 30, first minus first-order diffraction light beam 31, and plus and minus second-order diffraction light beams or higher-order diffraction light beams. Production of plus and minus second-order diffraction light beams or higher-order diffraction light beams depends on the pitch of the first transmission type diffraction gratings 24a, the wavelength λ of the output light of the semiconductor laser array 2 which is the pumping light source, the refractive index n of the solid laser medium block 23, and the configuration of the section of the first transmission type diffraction grating 24a. The case of the first transmission type diffraction grating 24a being rectangular in the section is described, however, the invention is not limited thereto.

The zero-order diffraction light beam 29 propagates in the solid laser medium block 23 in a direction perpendicular to the optical axis 6 with its intensity being exponentially attenuated, thus forming an excitation region.

The first first-order diffraction light beam 30 advances at an angle θ (expressed by the following equation (1), and not zero) with the perpendicular line of the first transmission type diffraction grating 24. The grating pitch (d) of the first transmission type diffraction grating 24 is so determined that the angle θ approaches 90° as much as possible.

$$\theta = SIN^{-1} \lambda / nd \quad (1)$$

The first first-order diffraction light beam 30 propagates in the solid laser medium block 23 in a direction substantially in parallel with the optical axis 6 with its intensity being exponentially attenuated. Then, it is reflected from the first surface 26, as a result of which it propagates in the solid laser medium block 23 again with its intensity being exponentially attenuated, thus forming an excitation region.

The first minus first-order diffraction light beam 31 advances in such a manner that it is symmetrical with the above-described first first-order diffraction light beam 30 with respect to the perpendicular line of the first transmission type diffraction grating 24a. That is, the light beam 31 propagates in the solid laser medium block 23 in a direction substantially in parallel with the optical axis 6 with its intensity being exponentially attenuated. Thereafter, it is reflected from the second surface 27, so that it propagates in the solid laser medium block 23 again with its intensity being exponentially attenuated, thus forming an excitation region.

Similarly, the pumping light beam outputted by another one of the semiconductor lasers 19 forming the semiconductor laser array 2 is applied to the respective first transmission type diffraction grating 24a, so that a zero-order diffraction light beam, first-order diffraction light beam, minus first-order diffraction light beam, plus and minus second-order diffraction light beams or higher-order diffraction light beams are produced to propagate in the solid laser medium block 23, thus forming excitation regions.

The zero-order diffraction light beam 29 propagates in the solid laser medium block 23 in a direction substantially perpendicular to the optical axis 67 with its intensity being exponentially decreased, to reach the second diffraction grating 25, as a result of which a zero-order diffraction light beam 29, second first-order diffraction light beam 32, second minus first-order diffraction light beam 33, and plus and minus second-order diffraction light beams or higher-order diffraction light beams are produced with the aid of the second reflection type diffraction grating 25b. Production of the plus and minus second-order diffraction light beams or higher-order diffraction light beams depends on the grating pitch of the second reflection type diffraction gratings 25b, the wavelength λ of the output light beam of the semiconductor laser array 2 which is the pumping light source, the refractive index n of the solid laser medium block 23, and the configuration of the section of the second reflection type diffraction grating 25b. The case of the diffraction grating 25 being rectangular in section is described, however, the invention is not limited thereto.

The zero-order diffraction light beam 29 propagates in the solid laser medium block in a direction substantially perpendicular to the optical axis 6 toward the first diffraction grating 24, with its intensity being exponentially attenuated, thus forming an excitation region.

The second first-order diffraction light beam 32 advances at the angle θ (not zero) expressed by the aforementioned equation (1) (where the grating pitch of the second reflection type diffraction gratings 25b is equal to that of the first transmission type diffraction gratings 24a). The second first-order diffraction light beam 32 propagates in the solid laser medium block 23 in a direction substantially in parallel with the optical axis 6 with its intensity being exponentially attenuated, and then it is reflected from the first surface 26. As a result, the diffraction light beam 32 propagates in the solid laser medium block 23 again with its intensity being exponentially attenuated, thus forming an excitation region.

The second minus first-order diffraction light beam 33 advances in such a manner that it is substantially in symmetrical with the second first-order diffraction light beam 32 with respect to the perpendicular to the second reflection type diffraction grating 25b. That is, the light beam 33 propagates in the solid laser medium block 23 in a direction substantially in parallel with the optical axis (6) with its intensity being exponentially attenuated, and is then reflected from the second surface 27. As a result, the light beam 33 propagates in the solid laser medium block 23 again with its intensity being exponentially attenuated, thus forming an excitation region.

Thus, the resultant excitation region is the overlapping of those diffraction light beams. Since the above-described first first-order diffraction light beam 30, first minus first-order diffraction light beam 31, second first-order diffraction light beam 32 and second minus first-order diffraction light beam 33 progress substantially in parallel with the optical axis 6, the length of absorption is sufficiently long. In addition, the excitation region can be coincident with the mode volume, in the solid laser medium block 23, of the laser resonator mode 7. Hence, the solid laser device of the invention is high in the efficiency of excitation.

Figure 17:
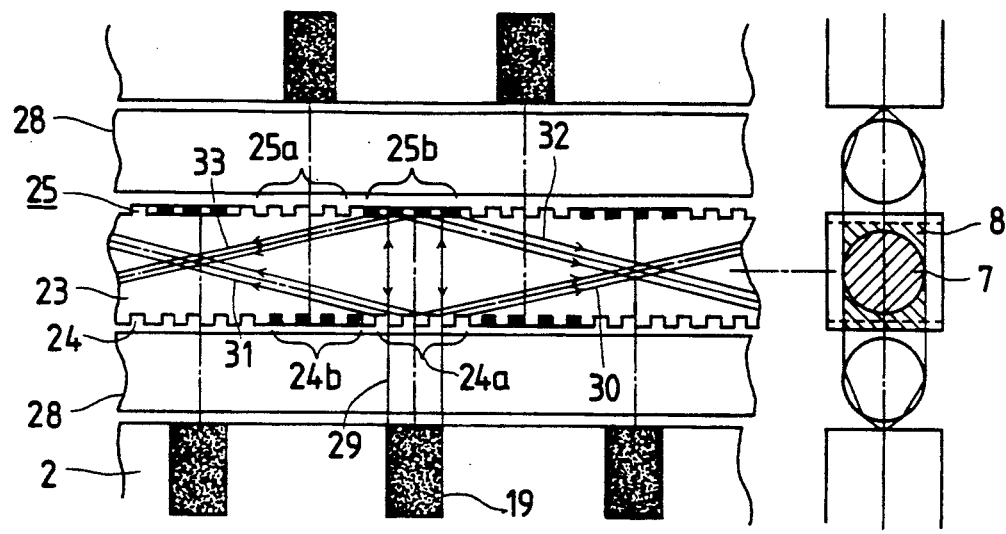
FIG. 17 is an explanatory diagram for a description of the operations of diffraction gratings in the solid laser in FIG. 16.

FIG. 17 is a diagram showing the relation of the zero-order diffraction light beam 29, first first-order diffraction light beam 30 and first minus first-order diffraction light beam 30 formed by the first diffraction grating 24 and the zero-order diffraction light beam 29, second first-order diffraction light beam 32 and second minus first-order diffraction light beam 33 formed by the second diffraction grating 25, and the relation between the excitation region 8 and the laser resonator mode 7. A major advantage of the means for forming an excitation region using diffraction gratings is that the pump volume of the pumping light can be made sufficiently coincident with the mode volume of the laser resonator. The mode volume of the laser resonator is determined by the set positions and configurations of the high reflection mirror 4 and the output coupling mirror 5. Of the laser resonator mode, the TEM$_{oo}$ mode is useful and preferable because it is of a single peak and has no side lobe. In the means for forming an excitation region using diffraction gratings, a number of semiconductor lasers can be arranged along the side of the solid laser medium block 23 where first and second diffraction gratings 24 and 25 are formed, and therefore the laser gain part of the solid laser medium block which is excited can be greatly increased, and the efficiency of excitation can be increased by matching the excitation region with the mode volume of the laser resonator. Thus, the solid laser device is high both in efficiency and in gain.

Figure 18:
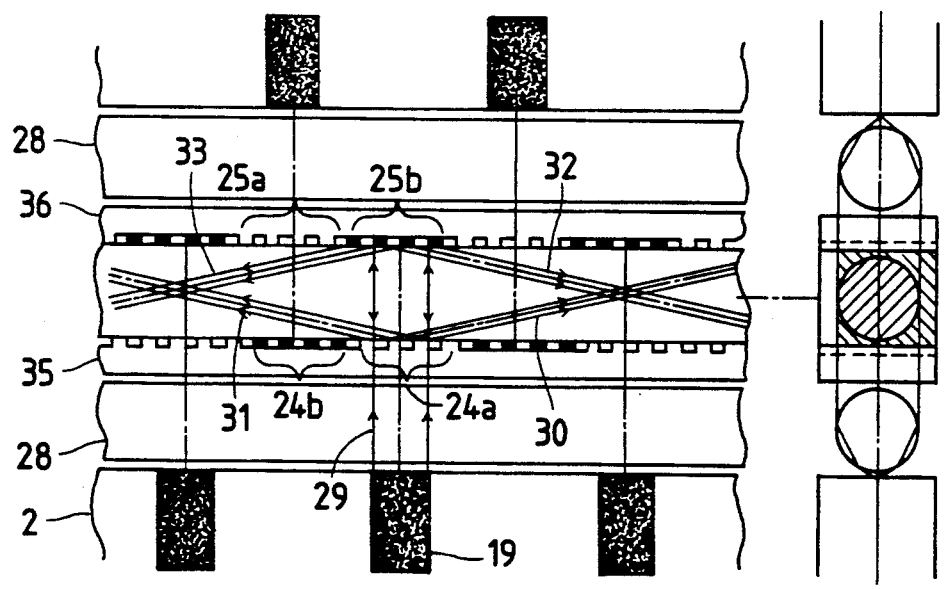
FIG. 18 is an explanatory diagram showing the operations of deffraction gratings in another example of the solid, laser device according to the invention.

FIG. 18 shows a second example of the semiconductor laser excited solid laser device according to the invention. In the second example, instead of the first and second diffraction gratings 24 and 25 formed directly on the solid laser medium block 23 in the first example, first and second diffraction grating blocks 35 and 36 are disposed in such a manner that they are near or in contact with the surface of the solid laser medium block 23.

The solid laser device according to the invention can employ various of solid laser materials such as Nd:YAG, Nd:Glass or Nd:YLF. In the solid laser device of the invention, the excitation region can be matched with the TEM$_{oo}$ mode which is the lowest mode of the laser resonator. In addition, the solid laser device can be made small in size. Hence, the solid laser device of the invention is suitable for frequency multiplication. That is, with a frequency multiplier inserted in the laser resonator, a laser beam can be produced whose wavelength is half ($\frac{1}{2}$) of that of the fundamental wave. For this purpose, the optical element 34 is disposed in the resonator as shown in FIG. 16. Pulse light can be produced by using a Q switch as the optical element 34 in the resonator shown in FIG. 16.

Figure 1:
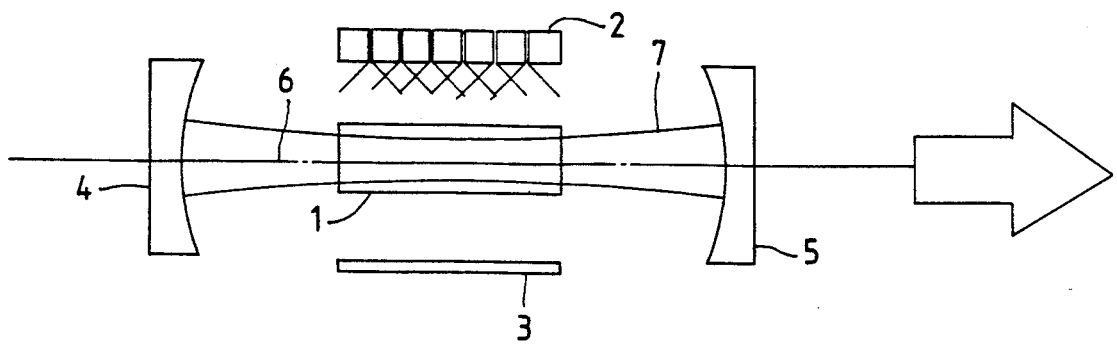
FIG. 1 is an explanatory diagram showing the arrangement of a conventional side light excited solid laser device.
Figure 2:
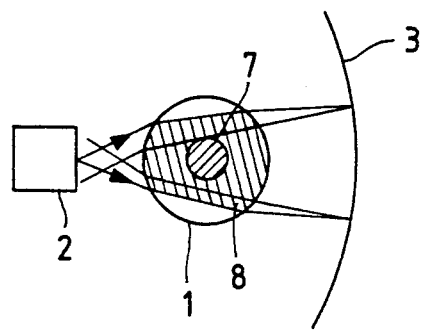
FIG. 2 is an explanatory diagram showing the relationships between the excitation region and the laser oscillation mode in the conventional side light excited solid laser device shown in FIG. 1.
Figure 3:
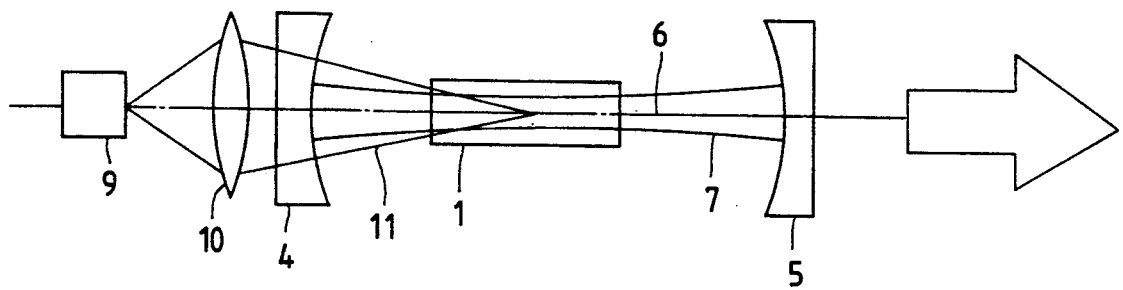
FIG. 3 is an explanatory diagram showing one example of a conventional end light excited solid laser device.
Figure 4:
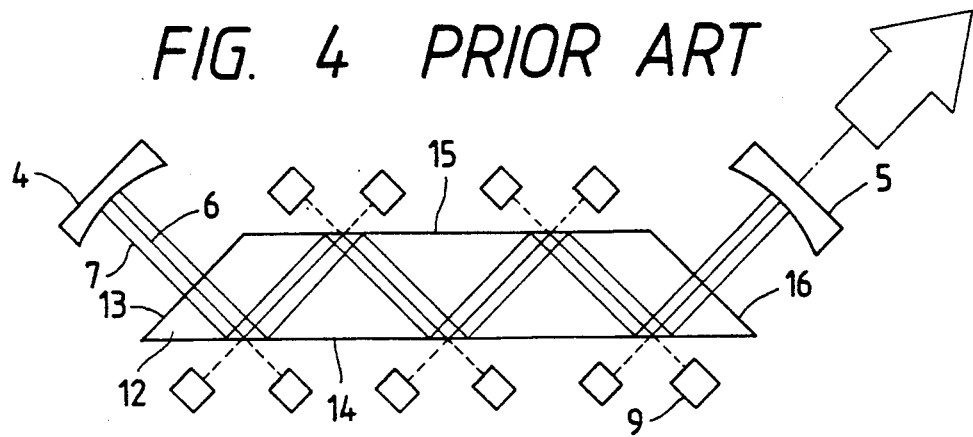
FIGS. 4 and 5 are explanatory diagrams showing other examples of the conventional end light excited solid laser device.
Figure 5:
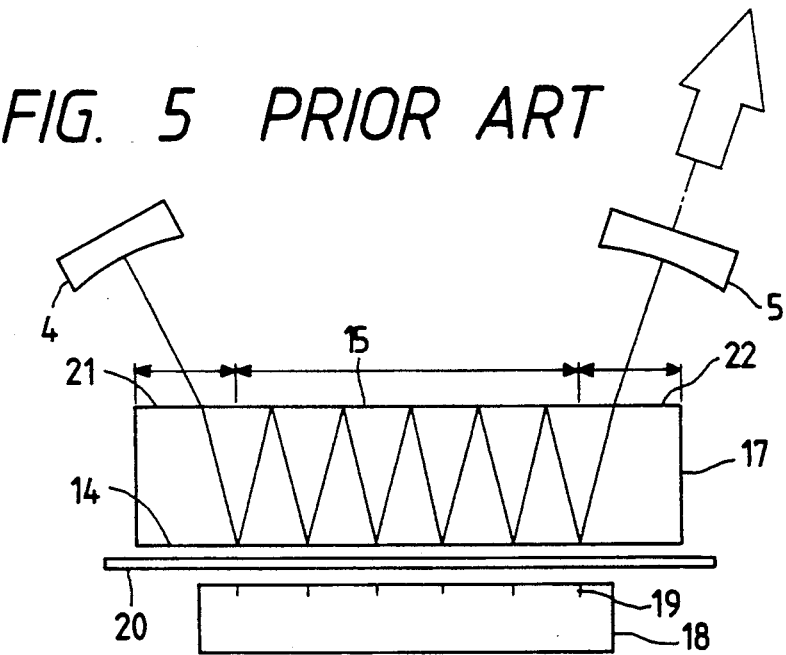
Figure 6:
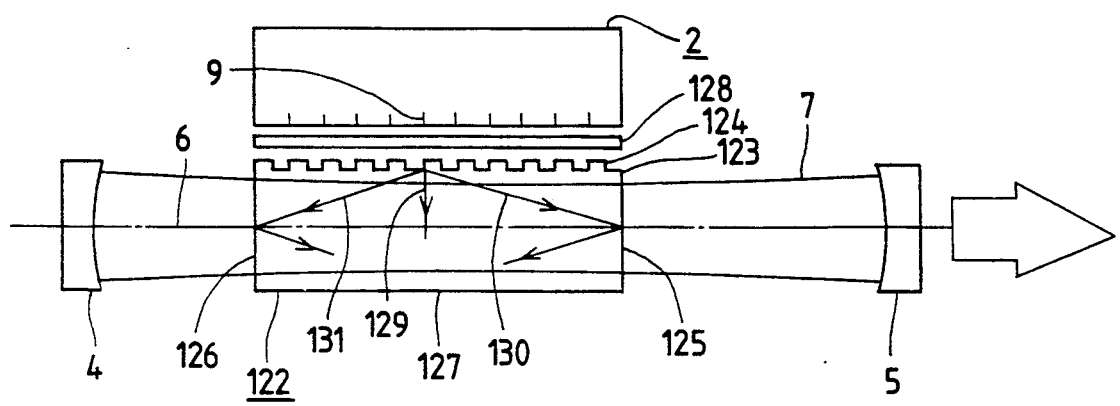
FIG. 6 is an explanatory diagram showing the arrangement of a first example of a semiconductor laser excited solid laser device according to a second aspect of the invention.

FIG. 6 shows the arrangement of a first example of a semiconductor laser excited solid laser device according to a second aspect of the invention.

In FIG. 6, reference numeral 122 designates a solid laser medium; 123, a first side face of the solid laser medium; 124, a transmission type diffraction grating formed on the first side face 123; 125, a first surface of the solid laser medium 122; 126, a second surface of the solid laser medium 122; 127, a second side face of the solid laser medium 122 which confronts with the first side face; 128, a rod lens disposed between a semiconductor laser array 2 and the diffraction grating 124 so as to apply the output lights of the semiconductor lasers 9 of the semiconductor laser array 2 with high efficiency; 129, the zero-order diffraction light beam of the output light of a semiconductor laser by the diffraction grating 124; 130, a first-order diffraction light beam; and 131, a minus first-order diffraction light beam.

A dielectric multi-layer film which has high reflection for the pumping light of the semiconductor laser array 2 but has no reflection for the wavelength of oscillation of the solid laser is formed on each of the first and second surfaces 125 and 126. A dielectric multi-layer film which has high reflection for the pumping light of the semiconductor laser array 2 is formed on the second side face 127. The semiconductor laser array 2 is made up of the plurality of semiconductor lasers 9 which are arranged in the direction of the optical axis 6 at equal intervals in such a manner that the junctions of the semiconductor lasers 9 are substantially in parallel.

The operation of the solid laser device thus constructed is substantially equal to that of the solid laser device described before with reference to FIG. 16. Even if the diffraction grating 124 is rectangular in section, the zero-order diffraction light beam can be suppressed by setting the grating pitch and the grating depth to suitable values.

Figure 7A:
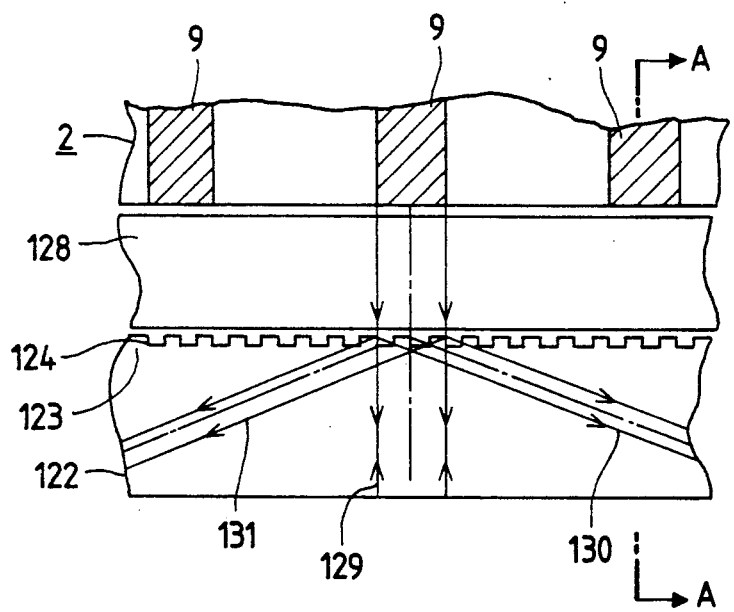
FIGS. 7A and 7B are enlarged diagrams showing a part of FIG. 6.
Figure 7B:
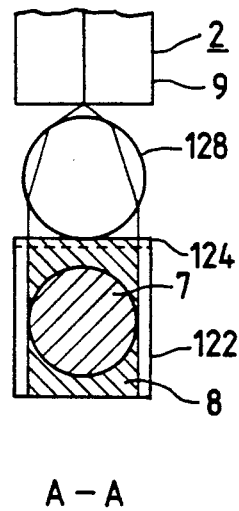

FIGS. 7A and 7B are enlarged diagrams of a part of FIG. 6, for a description of the relation between the first-order diffraction light beam 130 and the minus first-order diffraction light beam 131, and the relation between the excitation region 8 and the laser resonator mode 7 in the solid laser medium 122. More specifically, FIG. 7A is a diagram showing a part of the solid laser medium 122, and FIG. 7B is a sectional view taken along line A—A in FIG. 7A.

As is apparent from the overlapping of the excitation region 8 and the laser resonator mode 7 in FIG. 7B, with the means for forming the excitation region 8 using the diffraction grating 124, the pump volume of the pumping light can be sufficiently made coincident with the mode volume of the laser resonator. The mode volume of the laser resonator is determined by the positions and configurations of the high reflection mirror 4 and the output coupling mirror 5. Of the laser resonator mode, the TEM$_{oo}$ mode is useful and preferable because it is of a single peak and has no side lobe. In the means for forming an excitation region using the diffraction grating 124, a number of semiconductor lasers can be arranged along the side of the solid laser medium 122 on which the diffraction grating 124 is formed, and therefore the laser gain part of the solid laser medium block which is excited can be greatly increased, and the efficiency of excitation can be increased by matching the excitation region with the mode volume of the laser resonator. Thus, the solid laser device is high both in efficiency and in gain.

Figure 8A:
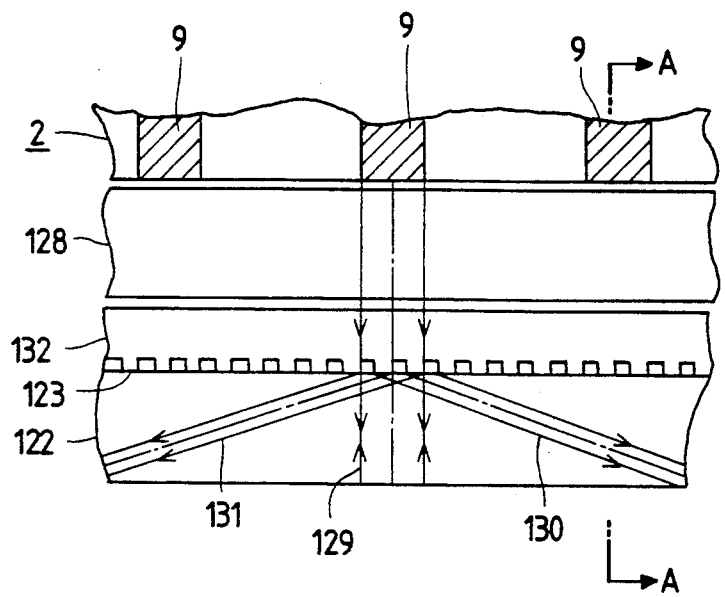
FIG. 8A and 8B are diagrams for a description of the arrangement of a second example of the solid laser device shown own according to the second aspect of the invention.
Figure 8B:
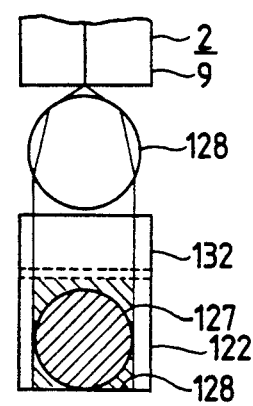

A second example of the semiconductor laser excited solid laser device according to the second aspect of the invention is as shown in FIGS. 8A and 8B corresponding to FIGS. 7A and 7B. More specifically, FIGS. 8A and 8B are enlarged diagrams showing a part of the solid laser device. In the solid laser device, the diffraction grating is not formed on the solid laser medium 122; that is, a transmission type diffraction grating 132 is formed in such a manner that it is near or in contact with the first side face 123 of the solid laser medium 122. The transmission type diffraction grating 132 and the solid laser medium 122 are matched with each other in refractive index.

Figure 9A:
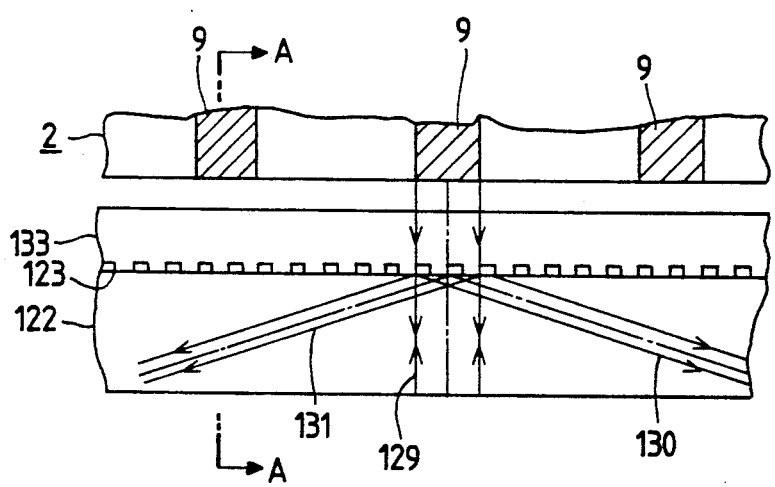
FIGS. 9A and 9B are diagrams for a description of the arrangement of a third example of the solid laser device according to the second aspect of the invention.
Figure 9B:
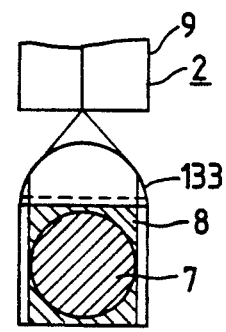

A third example of the semiconductor laser excited solid laser device according to the second aspect of the invention is as shown in FIGS. 9A and 9B corresponding to FIGS. 7A and 7B. More specifically, FIGS. 9A and 9B are enlarged diagrams showing a part of the solid laser device. In the solid laser device, instead of the diffraction grating 124 formed directly on the solid laser medium 122 and the rod lens 128 circular in section, a rod lens semi-circular in section on the flat surface of which a transmission type diffraction grating is formed is arranged in such a manner that it is near or in contact with the first side face 123 of the solid laser medium 122. The rod lens 133 semi-circular in section, like the rod lens 128 circular in section, shows refraction only in a direction perpendicular to the surface of the drawing, so that it converts the output light beams of the semiconductor lasers 9 into parallel beams. The rod lens 133 on which the transmission type diffraction grating is formed, and the solid laser medium 122 are matched with each other in refractive index.

In the second and third examples too, the diffraction grating acts in the same manner as that in the first example, thus providing the same effects.

Figure 10:
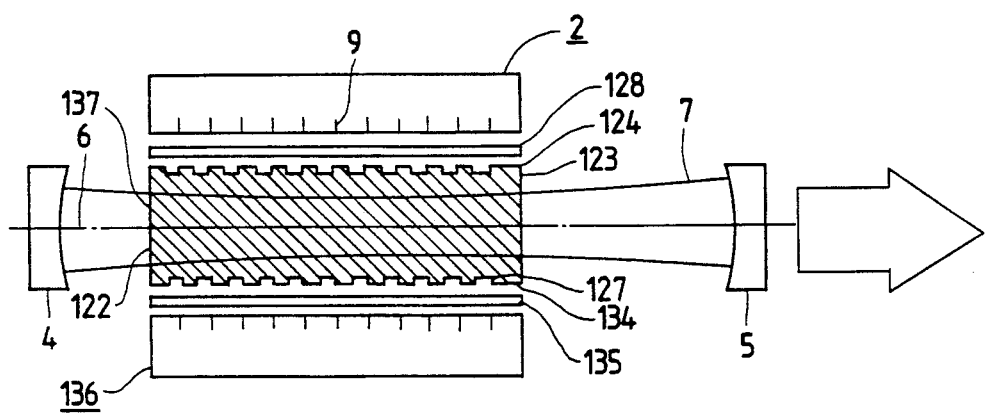
FIG. 10 is a diagram for a description of the arrangement of a fourth example of the solid laser device according to the second aspect of the invention.

FIG. 10 is an explanatory diagram showing the arrangement of a fourth example of the semiconductor laser excited solid laser device according to the second aspect of the invention. The fourth example is obtained by modifying the first example shown in FIGS. 7A and 7B as follows: a diffraction grating 134 is formed is additionally formed on the second side face of the solid laser medium 122, and a rod lens 135 circular in section and a semiconductor laser array 136 are additionally similarly as in the case of the first side face 123, so that more pumping light is applied to the solid laser medium from round. In FIG. 10, reference numeral 137 designates the plus and minus first-order diffraction light beams by the diffraction gratings 124 and 134.

In the solid laser device shown in FIG. 10, the diffraction gratings 124 and 134 are formed on the first and second side faces of the solid laser medium 122, respectively. However, the solid laser device may be so modified that diffraction gratings are additionally formed on the remaining two side faces of the solid laser medium 122.

Furthermore, it goes without saying that in formation of the diffraction gratings in the fourth example shown in FIG. 10, the technical concepts of the second and third examples may be employed.

In the above-described examples of the solid laser device according to the second aspect of the invention, the transmission type diffraction grating or gratings are employed. However, they may employ a reflection type diffraction grating.

Figure 11:
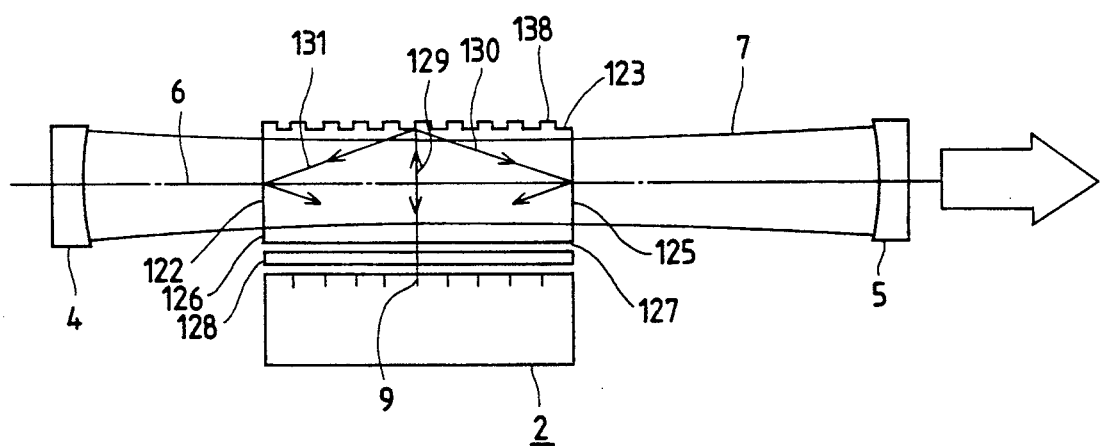
FIG. 11 is an explanatory diagram showing the arrangement of a/first example of a semiconductor laser excited solid state device which employs a reflection type diffraction grating according to the invention.

FIG. 11 shows a first example of such a solid laser device using a reflection type diffraction grating, corresponding to the example shown in FIGS. 7A and 7B. In FIG. 11, reference numeral 138 designates a reflection type diffraction grating formed on the first side face 123 of the solid laser medium 122. The diffraction grating 138 is covered with a dielectric multi-layer film or metal film which reflects the pumping light of the semiconductor laser array 2 with high percentage. The rod lens 128 and the semiconductor laser array 2 are provided on the side of the second side face of the solid laser medium 122. The output light beams of the semiconductor lasers 9 are converted by the rod lens into parallel light beams in a direction perpendicular to the surface of the drawing. The parallel light beams are applied to the solid laser medium 122, and diffracted by the reflection type diffraction grating 138, thus forming an excitation region 8. Similarly as in the case of the above-described transmission type diffraction grating, in the reflection type diffraction grating 138 the grating depth and the grating pitch are so determined that the zero-order diffraction light is suppressed.

Figure 12A:
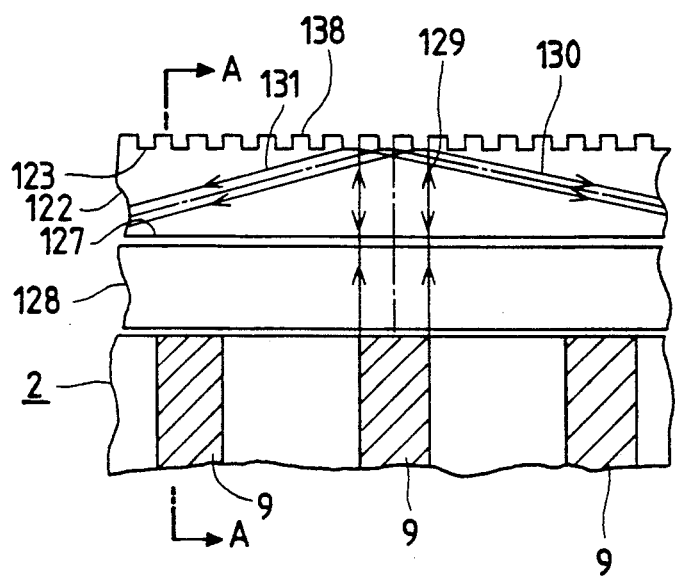
FIGS. 12A and 12B are enlarged diagrams of a part of FIG. 11.
Figure 12B:
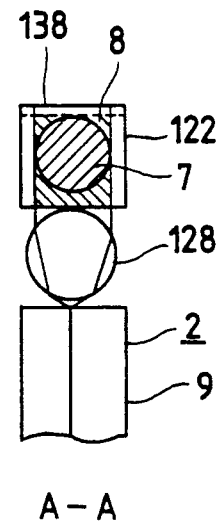

FIGS. 12A and 12B are enlarged diagrams showing a part of FIG. 11, for a description of the relations between the zero-order diffraction light beam 129, first-order diffraction light beam 130, and minus first-order diffraction light beam 131 formed by the reflection type diffraction grating 138, and the relation between the excitation region 8 and the laser resonator mode 7 in the solid laser medium 122. More specifically, FIG. 12A is a diagram showing a part of the solid laser medium 122, and FIG. 12B is a sectional view taken along line A—A in FIG. 12A.

As is apparent form the overlapping of the excitation region 8 and the laser resonator mode 7 shown in FIG. 12B, the means for forming the excitation region 8 using the reflection type diffraction grating 138 is advantageous in that the pump volume of the pumping light can be made well matched with the mode volume of the laser resonator, whereby similarly as in the case of the above-described transmission type diffraction grating, the resultant semiconductor laser excited solid laser device is high both in efficiency and in gain. Furthermore, the reflection type diffraction grating can be formed readily, because the diffraction effect of the transmission type diffraction grating can be obtained by the reflection type diffraction grating whose grating depth is half of that of the transmission type diffraction grating.

Figure 13A:
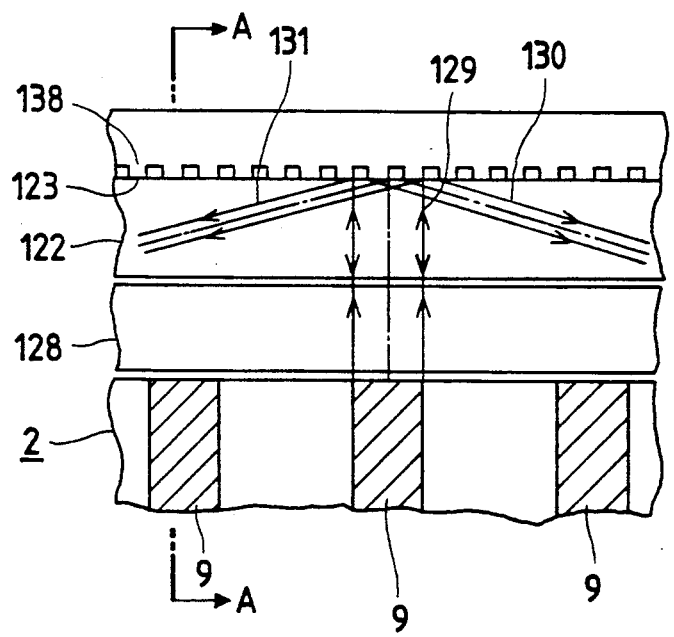
FIGS. 13A and 13B are explanatory diagrams for a description of the arrangement of a second example of the solid laser device shown in FIG. 11.
Figure 13B:
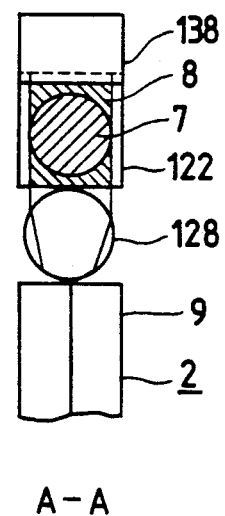

FIGS. 13A and 13B are diagrams showing a second example of the semiconductor laser excited solid laser device using the reflection type diffraction grating, corresponding to the solid laser device shown in FIG. 8. Similarly as in the case of FIGS. 12A and 12B, FIGS. 13A and 13B are enlarged diagrams showing a part of the semiconductor laser excited solid laser device. In the example, the reflection type diffraction grating 138 is not formed on the solid laser medium 122, and instead it is arranged in such a manner that it is near or in contact with the first side face 123 of the solid laser medium 122. The reflection type diffraction grating 138 is matched with the solid laser medium 122 in refractive index. In the second example, the reflection type diffraction grating operates in the same manner as in the first example described with reference to FIGS. 12A and 12B, thus providing the same effects.

In the above-described solid laser devices, the output light beams of the semiconductor lasers are applied to the solid laser medium by being so diffracted through the diffraction grating as to be in alignment with the direction of formation of the laser resonator mode in the solid laser medium, and therefore the relevant components can be relatively low in setting accuracy.

In the above-described solid laser devices, the laser resonator is so designed that the solid laser medium is in the form of a quadrangular prism, and the direction of the principal axis of the quadrangular prism coincides with the direction of the optical axis of the laser resonator, and the pumping light source is so positioned that the pumping light of the semiconductor lasers are applied to the solid laser medium from around, or perpendicularly to the principal axis of the latter; however, it should be noted that the invention is not limited thereto or thereby. That is, the solid laser device can be modified freely under the conditions, as was described before, the output light beams of the semiconductor lasers are applied to the solid laser medium by being so diffracted through the diffraction grating as to be in alignment with the direction of formation of the laser resonator mode in the solid laser medium, whereby the pump volume of the pumping light is made coincident with the mode volume of the laser resonator.

Figure 14:
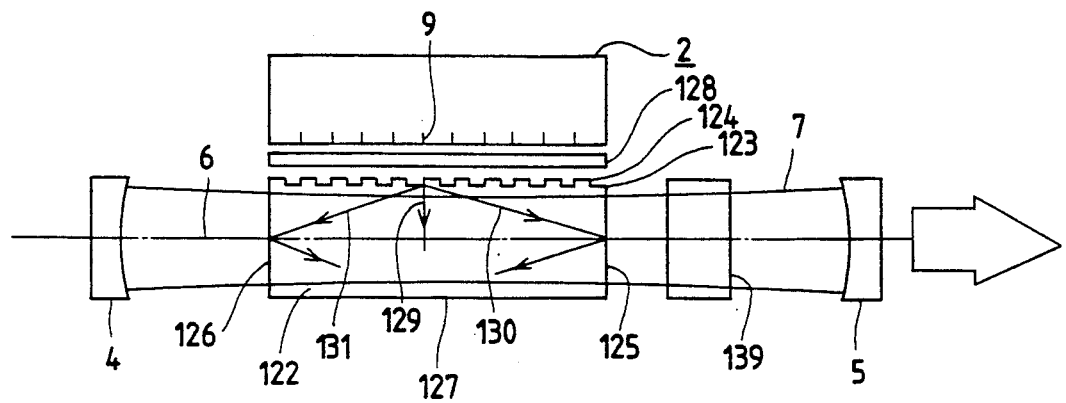
FIG. 14 is an explanatory diagram showing the arrangement of one example of the semiconductor laser excited solid laser device which is so modified as to perform frequency multiplication.

The solid laser device according to the invention can employ a wide range of solid laser materials such as Nd:YAG, Nd:Glass or Nd:YLF. Furthermore, in the solid laser device of the invention, the excitation mode can be matched with the $TEM_{oo}$ mode which is the lowest mode of the laser resonator, and miniaturization can be effected. Hence, the solid laser device of the invention is suitable for frequency multiplication. One example of the semiconductor laser excited solid laser device applied for frequency multiplication is as shown in FIG. 14, in which a frequency multiplier 139 is inserted in the laser resonator, generating a laser beam whose wavelength is half ($\frac{1}{2}$) of that of the fundamental wave.

Figure 15:
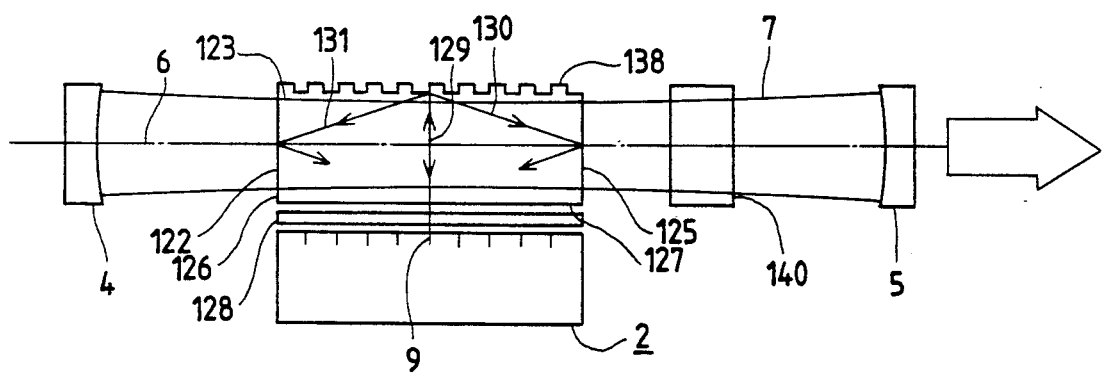
FIG. 15 is an explanatory diagram showing the arrangement of one example of the semiconductor laser excited solid laser device which is so modified as to generate pulse light.

In the solid laser device of the invention, pulse light can be produced with a Q switch inserted in the laser resonator as shown in FIG. 15 as the optical element 34 in the resonator shown in FIG. 16.

FIG. 19 shows a first example of a semiconductor laser excited solid laser device according to the invention which has four reflection type diffraction gratings, four non-reflection coatings, and four semiconductor laser arrays for instance. It goes without saying that the numbers of those components are not limited to four.

In FIG. 19, reference characters 2a, 2b, 2c and 2d designate semiconductor laser arrays; 222, a solid laser medium 223a, 223b, 223c and 223d, reflection type diffraction block; gratings; 224a, 224b, 224c and 224d, non-reflection coatings; 225, a first surface; 226, a second surface; 227a, 227b, 227c and 227d, rod lenses; 228, a zero-order diffraction light beam; 229, a first-order diffraction light beam; 230, a minus first-order diffraction light beam; and 231, an optical element in the resonator. The reflection type diffraction gratings 223a through 223d are so arranged that they are near or in contact with the surface of the solid laser medium block 222 and confront with the non-reflection coatings 224a, 224b, 224c and 224d, respectively. The first and second surfaces 225 and 226 of the solid laser medium block are covered with a dielectric multi-layer film which shows high reflection for the pumping light of the semiconductor laser arrays 2 but shows substantially no reflection for the wavelength of oscillation of the solid laser. The semiconductor laser arrays 2a through 2d disposed confronted with the non-reflection coatings 224 form a pumping light source. Each of the semiconductor laser arrays 2a through 2d is made up of a plurality of semiconductor lasers 9 which are disposed longitudinally at equal intervals in such a manner that the junctions thereof are in parallel with one another.

The operation of the solid laser device thus constructed is substantially equal to those of the above-described ones.

Another example of the semiconductor laser excited solid laser device shown is shown in FIG. 20. In the device, wave plates 232 are disposed between the solid laser medium block 222 and the rod lenses 227. In the case where the solid laser medium block 222 is of a uniaxial crystal like Nd:YLF, the absorption coefficient depends on the direction of polarization of the output light of the semiconductor laser array 2. Therefore, the wave plates are employed so that the directions of polarization of the output light beams of the semiconductor laser arrays are set to increase the absorption coefficient.

In the solid laser device of the invention, the excitation region can be matched with the $TEM_{oo}$ mode which is the lowest mode of the laser resonator, and miniaturization can be effected. Hence, the solid laser device of the invention is suitable for frequency multiplication. That is, with a frequency multiplier inserted in the laser resonator, a laser beam can be produced whose wavelength is half ($\frac{1}{2}$) of that of the fundamental wave. For this purpose, the optical element 231 is disposed in the resonator as shown in FIG. 19. Pulse light can be produced by using a Q switch as the optical element 231 in the resonator shown in FIG. 19.

As was described above, in the semiconductor laser excited solid laser device of the invention, the excitation region is formed with pair of diffraction gratings arranged on both side faces of the solid laser medium block in such a manner that they are substantially in parallel with each other, and a number of semiconductor lasers can be arranged along the sides of the solid laser medium block on which the diffraction gratings are formed. Accordingly, the solid laser medium can be increased in laser gain, and the excitation efficiency can be increased with the excitation region matched with the relevant mode volume of the laser resonator. Thus, the solid laser device of the invention is high both in efficiency and in gain, and low in manufacturing cost, and can be low in setting accuracy.

In the case where the reflection type diffraction grating is employed, the diffraction provided by the transmission type diffraction grating can be achieved by the reflection type diffraction grating whose grating depth is half of that of the transmission type diffraction grating. In this case, the diffraction grating can be formed readily accordingly.

What is claimed is:

1. A semiconductor laser excited solid laser device comprising:
   a solid laser medium in which an excitation region is formed;
   semiconductor laser array means arranged longitudinally along a side face of said solid laser medium, for applying pumping light to said solid laser medium;
   lens means disposed between said solid laser medium and said semiconductor laser array means, for converting a divergent laser beam from said semiconductor laser array means into a substantially non-divergent parallel light beam;
   a resonator for forming a laser resonator mode in said solid laser medium; and
   diffraction grating means for diffracting said parallel light beam of said semiconductor lasers in a direction of formation of said laser resonator mode.

2. A semiconductor laser excited solid laser device as claimed in claim 1, wherein said diffraction grating means
   is formed on the side surface of the solid laser medium.

3. A semiconductor laser excited solid laser device as claimed in claim 2, wherein said diffraction grating means is at least one selected from transmission type diffraction gratings and reflection type diffraction gratings.

4. A semiconductor laser excited solid laser device as claimed in claim 1, wherein said diffraction grating means comprises a diffraction grating block disposed near or in contact with the side face of the solid laser medium.

5. A semiconductor laser excited solid laser device as claimed in claim 4, wherein said diffraction grating block is at least one selected from transmission type diffraction gratings and reflection type diffraction gratings.

6. A semiconductor laser excited solid laser device as claimed in claim 1, wherein said diffraction grating means is a diffraction grating block in which transmission type diffraction gratings and reflection type diffraction gratings are alternately arranged between said solid laser medium and said semiconductor laser array means in such a manner that said diffraction gratings are substantially in parallel with said semiconductor laser array means.

7. A semiconductor laser excited solid laser device as claimed in claim 1, wherein said lens means comprises a rod lens semi-circular in section, on a flat surface of which a transmission type diffraction grating being formed, in such a manner the rod lens semi-circular in section is disposed near or in contact with the side face of the solid laser medium.

8. A semiconductor laser excited solid laser device as claimed in claim 1, in which said semiconductor laser array means, said lens means, and diffraction grating means are plurally provided.

9. A semiconductor laser excited solid laser device as claimed in claim 1, wherein said solid laser medium has substantially parallel side faces on which at least one non-reflection coating and at least one reflection type diffraction grating arranged in such a manner as to be near or in contact with said side faces are alternately located, said non-reflection coating being confronted with said reflection type diffraction grating; at least one semiconductor laser array means comprises a plurality of semiconductor lasers arranged confronted with said non-reflection coating; and at least one lens means disposed between said side face on which said non-reflection coating is formed and said semiconductor laser array.

10. A semiconductor laser excited solid laser device as claimed in claim 7, further comprising at least one wave plate is disposed between said side face of said solid laser medium and said rod lens.

* * * * *